US008857590B2

(12) United States Patent
Shaw et al.

(10) Patent No.: US 8,857,590 B2
(45) Date of Patent: Oct. 14, 2014

(54) DIECAST COUPLING MEMBER INCLUDING A POCKET HAVING A MACHINED SURFACE PORTION, METHOD FOR MAKING THE COUPLING MEMBER AND CLUTCH ASSEMBLY INCLUDING THE COUPLING MEMBER

(75) Inventors: David W. Shaw, Saginaw, MI (US);
Stephen M. Ruth, Holly, MI (US);
Jeffrey J. Prout, Freeland, MI (US)

(73) Assignee: Means Industries, Inc., Saginaw, MI (US)

( * ) Notice: Subject to any disclaimer, the term of this patent is extended or adjusted under 35 U.S.C. 154(b) by 299 days.

(21) Appl. No.: 13/150,522

(22) Filed: Jun. 1, 2011

(65) Prior Publication Data
US 2011/0297500 A1 Dec. 8, 2011

Related U.S. Application Data

(63) Continuation-in-part of application No. 12/956,110, filed on Nov. 30, 2010, now Pat. No. 8,602,189.

(60) Provisional application No. 61/311,033, filed on Mar. 5, 2010.

(51) Int. Cl.
*F16D 41/12* (2006.01)
(52) U.S. Cl.
CPC .......... *F16D 41/125* (2013.01); *F16D 2250/00* (2013.01); *F16D 41/12* (2013.01)
USPC .......... 192/46; 192/69.1; 192/107 M; 192/108
(58) Field of Classification Search
USPC ....................................................... 192/69.1
See application file for complete search history.

(56) References Cited

U.S. PATENT DOCUMENTS 4,679,681 A 7/1987 Creydt et al.
(Continued)

FOREIGN PATENT DOCUMENTS

WO 2008103683 A1 8/2008

OTHER PUBLICATIONS

International Search Report and Written Opinion; International Application No. PCT/US2011/026832; mailed May 3, 2011.
International Search Report and Written Opinion; International application No. PCT/US2012/039237; International filing date May 24, 2012; date of mailing Aug. 7, 2012.

(Continued)

*Primary Examiner* — Rodney H Bonck
(74) *Attorney, Agent, or Firm* — Brooks Kushman P.C.

(57) ABSTRACT

A diecast pocket plate or coupling member including a pocket with a machined surface layer or portion, a method for making the coupling member and an overrunning clutch assembly including the coupling member are provided. The member is formed as a unitary diecasting from a die-casting material in a die-casting process. The diecast member includes a coupling face having at least one pocket which is sized and shaped to receive and retain a locking member that moves in the pocket during an overrun condition of the assembly. The pocket is defined by a plurality of surface portions including an angled, slightly positive surface portion which is machined vertical or slightly negative to improve performance of the assembly during the overrun condition.

35 Claims, 7 Drawing Sheets

(56) References Cited

U.S. PATENT DOCUMENTS

| | | | |
|---|---|---|---|
| 5,597,057 A * | 1/1997 | Ruth et al. | 192/46 |
| 5,918,715 A * | 7/1999 | Ruth et al. | 192/46 |
| 6,125,980 A | 10/2000 | Ruth et al. | |
| 6,333,112 B1 | 12/2001 | Field et al. | |
| 6,557,681 B2 | 5/2003 | Kinoshita et al. | |
| 6,577,033 B1 | 6/2003 | Sekine | |
| 7,258,214 B2 * | 8/2007 | Pawley et al. | 192/46 |
| 2005/0279602 A1 | 12/2005 | Ruth | |
| 2006/0231366 A1 * | 10/2006 | Meggiolan | 192/46 |
| 2008/0135369 A1 | 6/2008 | Meier | |

OTHER PUBLICATIONS

International Preliminary Report on Patentability; International application No. PCT/US2011/026832; date of issuance of report Sep. 11, 2012.

International Preliminary Report on Patentability; International application No. PCT/US2012/039237; date of issuance of report Dec. 2, 2013.

Canadian Office Action issued in counterpart Canadian application No. 2,791,232; dated Dec. 16, 2013.

* cited by examiner

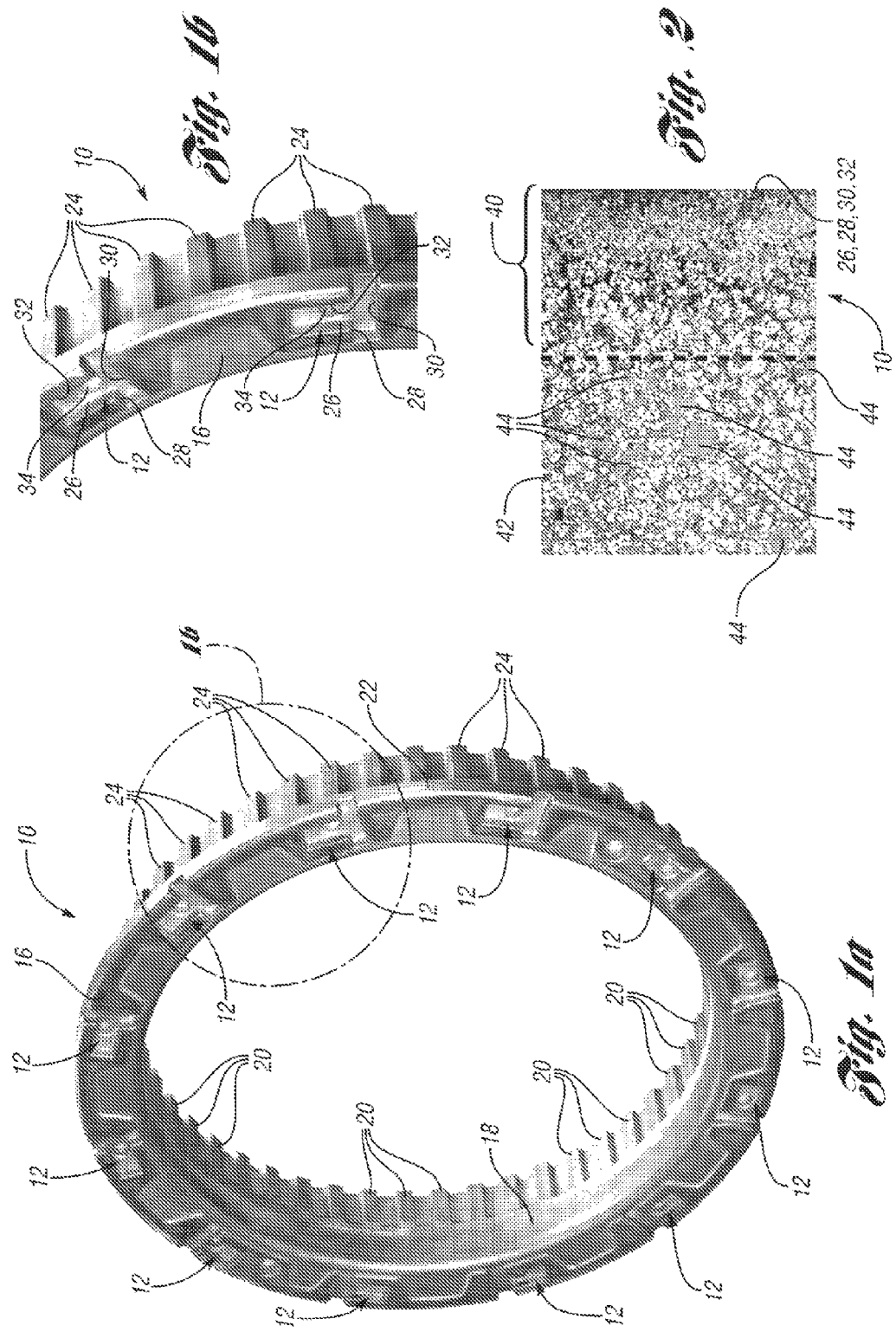

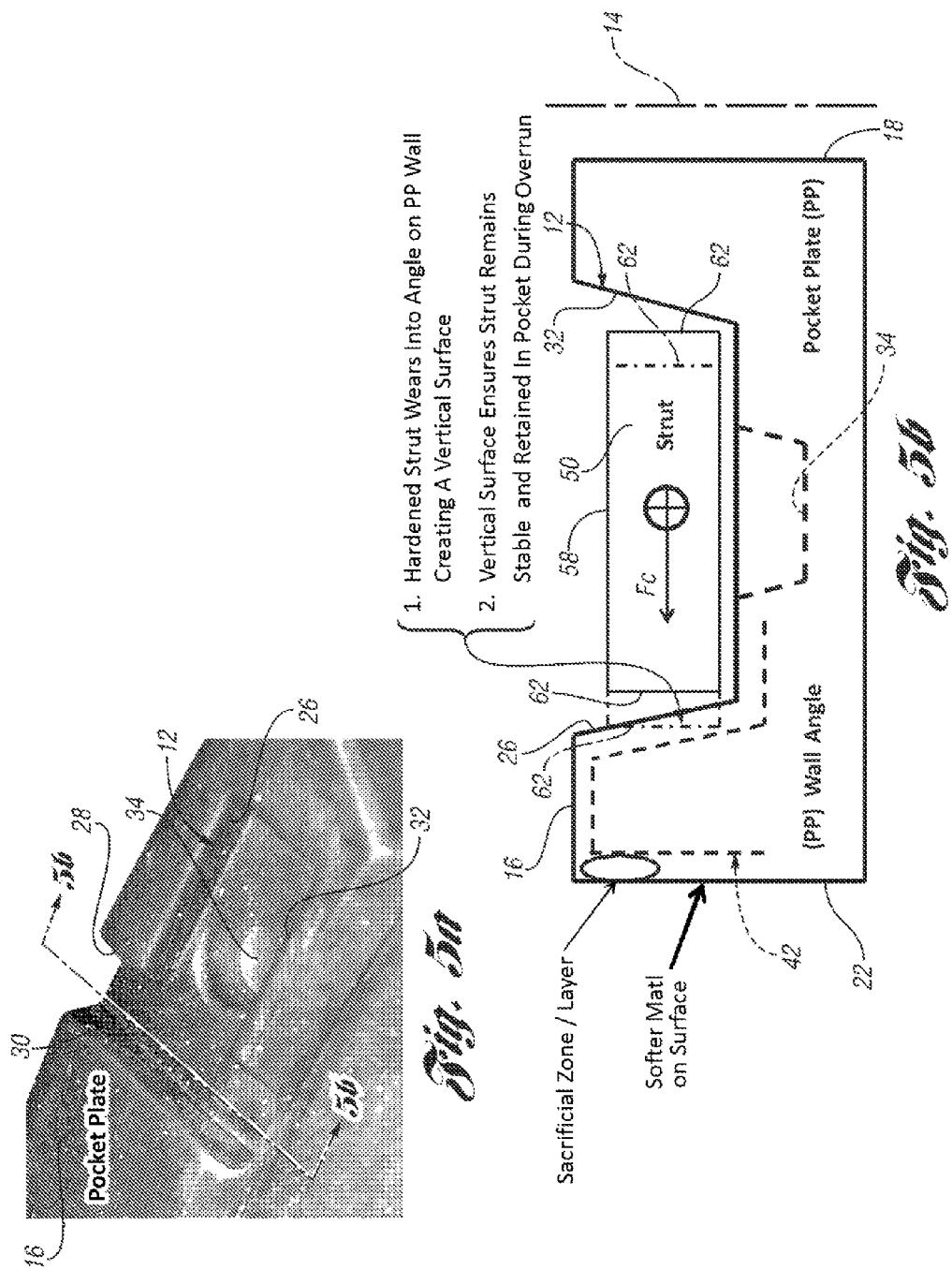

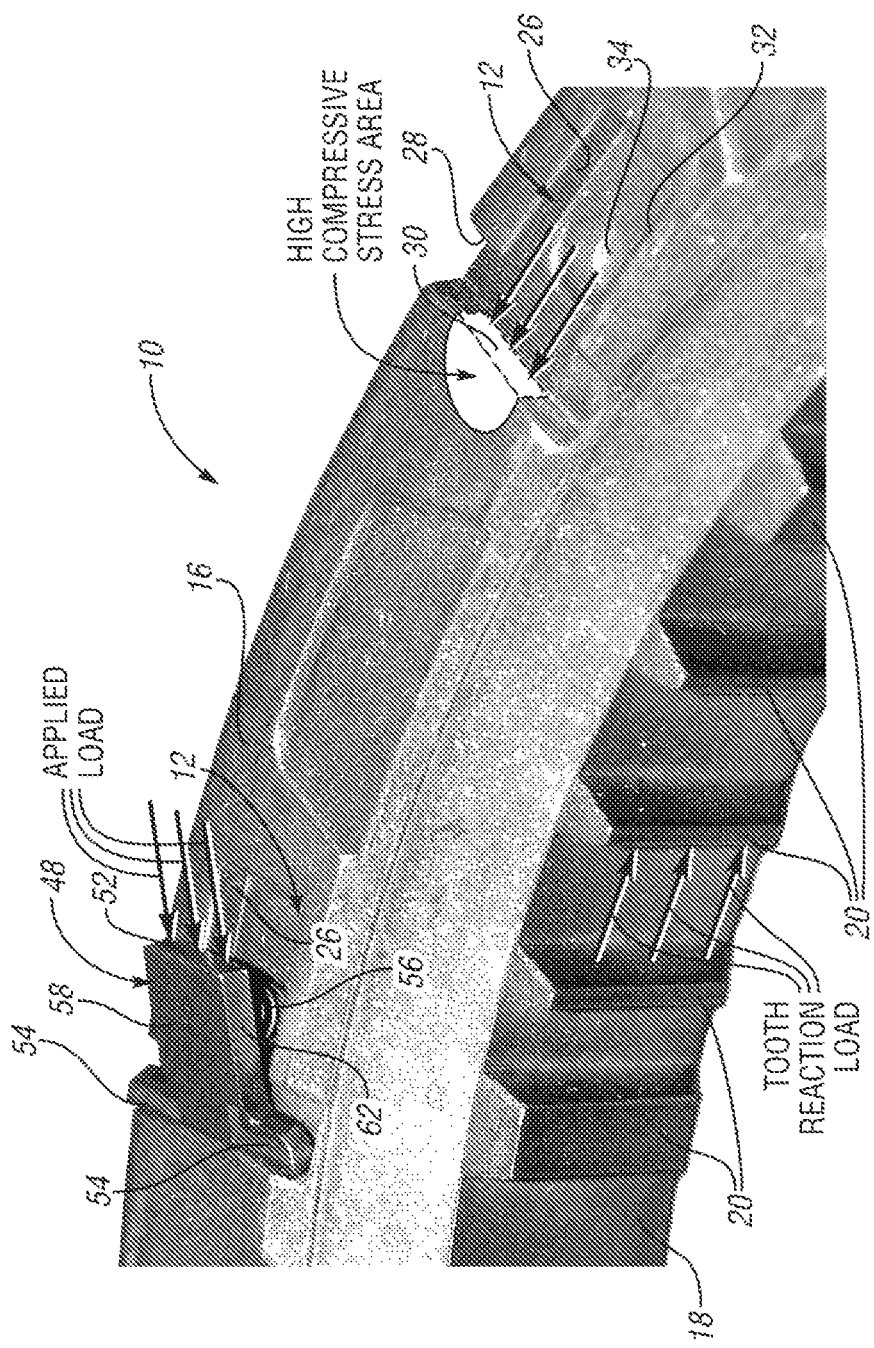

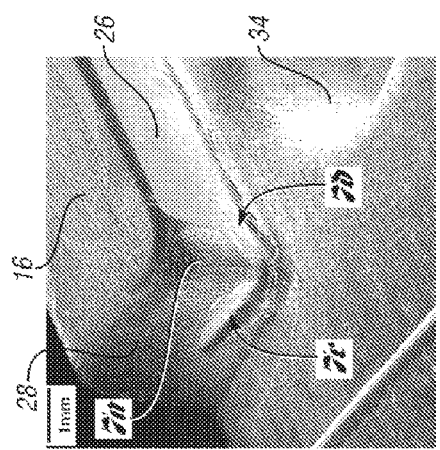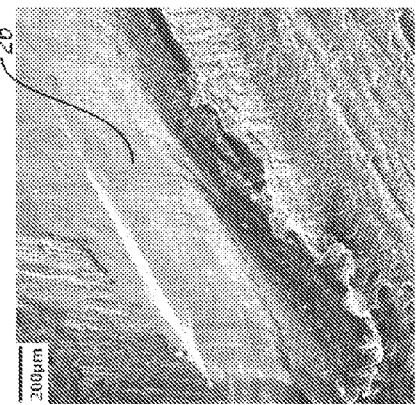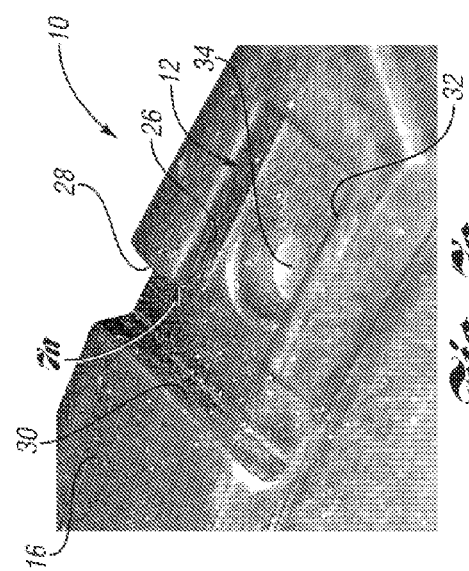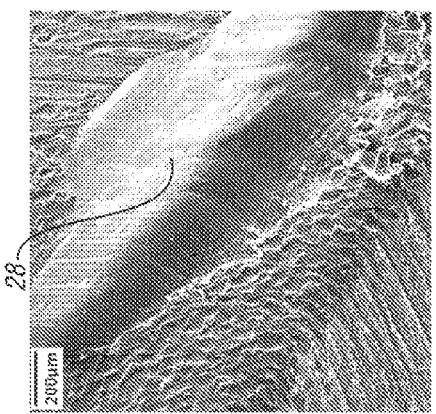

DIECAST COUPLING MEMBER INCLUDING A POCKET HAVING A MACHINED SURFACE PORTION, METHOD FOR MAKING THE COUPLING MEMBER AND CLUTCH ASSEMBLY INCLUDING THE COUPLING MEMBER

CROSS-REFERENCE TO RELATED APPLICATIONS

This application is a continuation-in-part application of U.S. patent application entitled "DIECAST COUPLING MEMBER FOR USE IN AN ENGAGEABLE COUPLING ASSEMBLY" filed on Nov. 30, 2010 and having U.S. Ser. No. 12/956,110. That application claims the benefit of U.S. provisional patent application entitled "POCKET PLATE HAVING A SACRIFICIAL SURFACE LAYER FOR USE IN ONE-WAY RATCHETING TYPE COUPLING OR CLUTCH ASSEMBLIES" filed on Mar. 5, 2010, and having U.S. Ser. No. 61/311,033.

BACKGROUND OF THE INVENTION

1. Field of the Invention

This invention relates to diecast coupling members such as pocket plates, methods for making such coupling members and clutch assemblies including such coupling members.

2. Background Art

Pocket plates or members for use in one-way ratcheting type coupling or clutch assemblies are typically formed using powdered ferrous metals. In contrast to other metal-forming techniques, powdered metal parts are shaped directly from powder, whereas castings originate from molten metal.

Other methods of forming pocket plates have been tried in an attempt to reduce cost. For example, U.S. Pat. No. 6,333,112 discloses a laminated pocket plate. U.S. Patent Publication No. 2008/0135369 discloses a stamped clutch pocket plate. U.S. Pat. No. 6,125,980 discloses a pocket plate integrated within a hub such as by casting or molding to form an integral assembly. The hub comprises an aluminum alloy casting or a phenolic molding. The pocket plate itself is preferably a powdered metal part.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY

An object of at least one embodiment of the present invention is to provide a diecast coupling member including a pocket having a machined surface portion, method for making the coupling member and clutch assembly including the coupling member.

In carrying out the above object and other objects of at least one embodiment of the present invention, a coupling member for an engageable coupling assembly is provided. The coupling member is formed as a unitary diecasting from a diecasting material in a diecasting process. The coupling member includes a coupling face having a pocket which is sized and shaped to receive and retain a locking member that moves in the pocket during an overrun condition of the assembly. The coupling member further includes a plurality of surface portions which define the pocket. An angled, slightly positive surface portion of the surface portions is machined vertical or slightly negative to improve performance of the assembly during the overrun condition.

The coupling member may include a base portion having particles of a strengthening alloying material. The particles of the alloying material may be exposed after machining so that the base portion does not wear or deform during contact of the locking member against the base portion during the overrun condition.

The strengthening alloying material may include at least one of elemental Si, Cu, Mg, Ni and Zn.

The machined surface portion may include an outboard edge surface.

The machined surface portion may be curved.

The diecasting material may be a non-ferrous alloy.

The coupling member may be a pocket plate.

The locking member may be a locking strut.

The coupling face may be an annular coupling face.

The coupling face may have a plurality of pockets. Each of the pockets may be sized and shaped to receive and retain a corresponding locking member.

The coupling member may be a clutch member.

The pocket may have a T-shape and the pocket may have an inner recess for receiving a biasing spring such that the pocket is a spring pocket.

The annular coupling face may be oriented to face axially along a rotational axis of the assembly or the annular coupling face may be oriented to face radially with respect to the rotational axis.

Further in carrying out the above object and other objects of the at least one embodiment of the present invention, a one-way clutch assembly having a central axis is provided. The assembly includes an annular notch plate that extends around the central axis and includes notches spaced apart from each other about the central axis. The assembly also includes a pocket plate. The pocket plate is formed as a unitary diecasting from a diecasting material in a diecasting process. The pocket plate includes an annular coupling face having a plurality of pockets spaced from each other about the central axis. Each of the pockets is sized and shaped to receive and retain a locking member that moves in the pocket during an overrun condition of the assembly. Each of the pockets of the pocket plate further includes a plurality of surface portions which define the pocket. An angled, slightly positive surface portion of the surface portions is machined vertical or slightly negative to improve performance of the assembly during the overrun condition. The assembly also includes a plurality of locking members within the pockets.

The pocket plate may include a base portion having particles of a strengthening alloying material. The particles of the alloying material may be exposed after machining so that the base portion does not wear or deform during contact of its respective locking member against the base portion during the overrun condition.

Still further in carrying out the above object and other objects of the present invention, a method for manufacturing a one-piece pocket plate for a one-way clutch assembly is provided. The method includes diecasting a pocket plate to form a unitary diecasting from a diecasting material. The pocket plate has an annular coupling face with a plurality of pockets spaced from each other about a central axis. Each of the pockets is sized and shaped to receive and nominally retain a locking member that moves in its respective pocket during an overrun condition of the assembly. Each of the pockets has a plurality of surface portions including an angled, slightly positive surface portion. The method also includes machining the slightly positively angled surface portions vertical or slightly negative to improve performance of the assembly during the overrun condition.

The machined surface portions may be curved.

The step of machining may include the step of forming a curved groove which communicates the pockets.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1a is a perspective, photorealistic view of an overrunning pocket plate or member of a one-way clutch or coupling assembly (not shown) constructed in accordance with at least one embodiment of the present invention;

FIG. 1b is an enlarged perspective photorealistic view, partially broken away, taken within the circle labeled 1b in FIG. 1a;

FIG. 2 is a metallographic sectional view of an outer surface portion of the cast pocket plate;

FIG. 5a is a view of the pocket plate similar to the view of FIG. 4b;

FIG. 5b is a side schematic view taken along lines 5b-5b of FIG. 5a and illustrating the pocket of the pocket plate;

FIG. 6 is yet another photorealistic view, partially broken away, illustrating: a tooth reaction load on the splines of the pocket plate;

FIG. 7a is a view similar to the view of FIGS. 4b and 5a after the strut has worn the various sacrificial layers defining surfaces of the pocket;

FIG. 7b is an electron microscopic image which includes the surfaces of FIG. 7a;

FIG. 7c is an enlarged view indicated by the notation "7c" in FIG. 7b;

FIG. 7d is an enlarged view indicated by the notation "7d" in FIG. 7b, and

DETAILED DESCRIPTION OF EXAMPLE EMBODIMENTS

Figure 3:
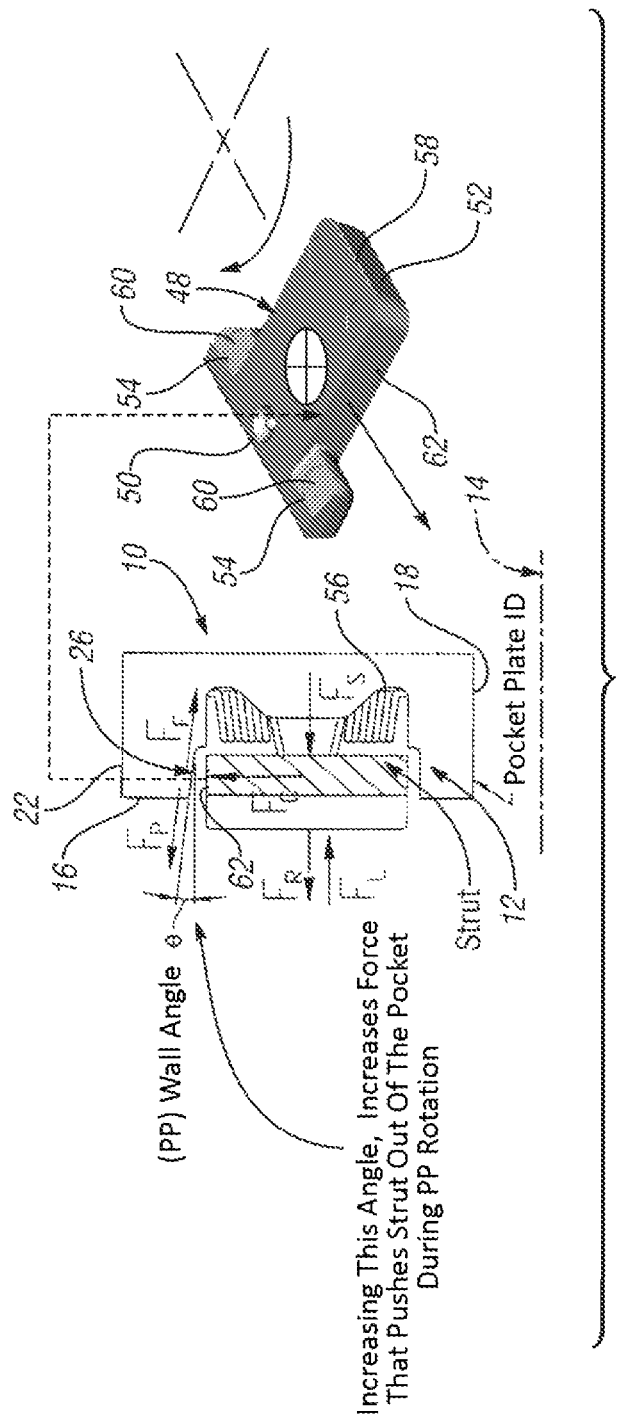
FIG. 3 includes a schematic perspective view of a strut or pawl together with a sectional view of the strut received and nominally retained within one of the pockets of the pocket plate.

FIG. 1a is a perspective, photorealistic view of an overrunning pocket plate or member, generally indicated at 10, of a one-way clutch or coupling assembly (not shown). FIG. 1b is an enlarged perspective photorealistic view, partially broken away, taken within the circle labeled 1b in FIG. 1a. The plate 10 includes a plurality of pockets or recesses, generally indicated at 12, circumferentially spaced about a rotary axis 14 or centerline of rotation (FIGS. 3 and 5b) within a radially extending face or surface 16 of the pocket plate 10. The pockets 12 are sized and shaped to permit them to be die cast in a liquid metal, permanent mold, diecasting process. The plate 10 has an inner axially extending surface 18 at a pocket plate inner diameter (FIG. 3) on which splines 20 are formed for driving engagement with a rotating member (not shown). The plate 10 also has an outer axially extending surface 22 on which splines 24 are formed.

Each of the recesses or pockets 12 is T-shaped and is partially defined by an outboard edge surface 26, an inside corner surface 28, a head edge surface 30, an inboard edge surface 32 and an inner recess 34.

The one-piece pocket plate 10 is preferably formed as a unitary diecasting from a non-ferrous casting alloy such as an aluminum silicon (Al—Si) diecasting alloy. The aluminum is strengthened by silicon and may also be strengthened by one or more of the following alloying elements: Cu, Mg, Ni and Zn. For example, the material may be an aluminum alloy 380 or 390 casting material. However, it is to be understood that other non-ferrous diecasting alloys may be used in forming the pocket plate 10 in a diecasting process.

FIG. 2 is a metallographic sectional view of an outer surface portion of the cast pocket plate 10 to illustrate the casting microstructure of the solid casted plate 10. During the liquid metal diecasting solidification process for the non-ferrous aluminum silicon alloy, an outer surface, relatively "soft skin" layer 40, forms on a relatively hard base or substrate portion 42 of the pocket plate 10. The layer 40, consequently, forms or defines the surfaces 26, 28, 30 and 32 of the pockets 12, as well as the surfaces 18, 22 and 16 of the pocket plate 10. The composite of the base or substrate layer material 42 has very hard (i.e. Rockwell hardness>60) particles 44 of silicon embedded therein. This is to be contrasted with the layer 40 which is free of primary silicon particles such as the particles 44. In other words, the layer 40 is a substantially silicon-depleted surface layer 40.

FIG. 3 includes a schematic perspective view of a strut or pawl, generally indicated at 48, together with a sectional view of the strut 48 received and nominally retained within one of the pockets 12 of the pocket plate 10. Each of the struts 48 is generally of the type shown in U.S. Pat. No. 6,065,576 to mechanically couple the pocket plate 10 to a notch plate or member (not shown) when the plates attempt to rotate relative to each other in a direction opposite an overrun direction illustrated in FIG. 4a in which the two plates are allowed to overrun relative to each other.

As illustrated in the schematic perspective view in FIG. 3, each strut 48 includes first and second end surfaces, 50 and 52, respectively, and a pair of oppositely projecting ears 54 which extend laterally from the strut 48 proximate from to its first end surface 50. The ears 54 cooperatively engage its respective pocket's complementary inner surfaces including the surfaces 28 and 30 to thereby nominally position a first end of the strut 48 including the first end surface 50 in its respective pocket 12.

Each of the locking formations or notches of the notch plate (not shown) is adapted to receive the free end portion of the strut 48 including the second end surface 52 of the strut 48 when the strut's free end is urged into a notch, for example, by a spring 56 seated beneath each strut 48 in its inner recess 34 of its pocket 12.

Each of the strut end surfaces 50 and 52 preferably include substantially planar sections which are canted to a nominal angle relative to an upper face 58 of the strut 48. The planar sections are substantially parallel to one another. Also, each of the ears 54 has a ramped upper surface 60 to prevent interference with the notch plate. Finally, each of the struts 48 includes spaced apart side surfaces 62.

The sectional view of FIG. 3 provides a dynamic engagement analysis of a strut 48 within its respective pocket 12 wherein various forces acting upon the strut 48 are illustrated and described as follows:

$F_R$=Resultant Strut Force. The force available to push the strut 48 out of its pocket 12 (i.e. resultant force on the strut 48).

$F_S$=Spring Force. The force created by the spring 56 used to push the strut 48 out of its pocket 12 for engagement with the notch plate (not shown).

$F_C$=Centrifugal Force. The effective weight of the strut 48 due to rotation of the pocket plate 10 during operation. (Force of strut 48 against pocket plate wall 26.)

$F_F$=Friction Force. This force is created by the effective weight of the strut 48 (centrifugal force) acting on the pocket plate 10. The higher the rotational speed the larger the friction force. This force prevents the strut 48 from pushing out of its pocket 12.

$F_P$=Strut Pushout Force. The angle of the pocket plate wall 26 causes the strut 48 to push out of the pocket plate 10. This is due to the centrifugal forces created by the rotation of the pocket plate 10.

$F_L$=Fluid Force. This force is created by the effect of the strut 48 displacing transmission fluid when engaging into the notch plate. From empirical data, this force has been shown to have a minimal effect and is ignored.

The pocket plate (i.e. PP) 10 and associated strut 48 of FIG. 3 has particular utility in the following applications:

PP has high % of continuous over-run and the NP (i.e., notch plate) is grounded (i.e., stationary);

PP is stationary (i.e., 0 RPM) after lock-up; and

PP RPM typically varies from 0 to 7000 RPM.

Figure 4B:
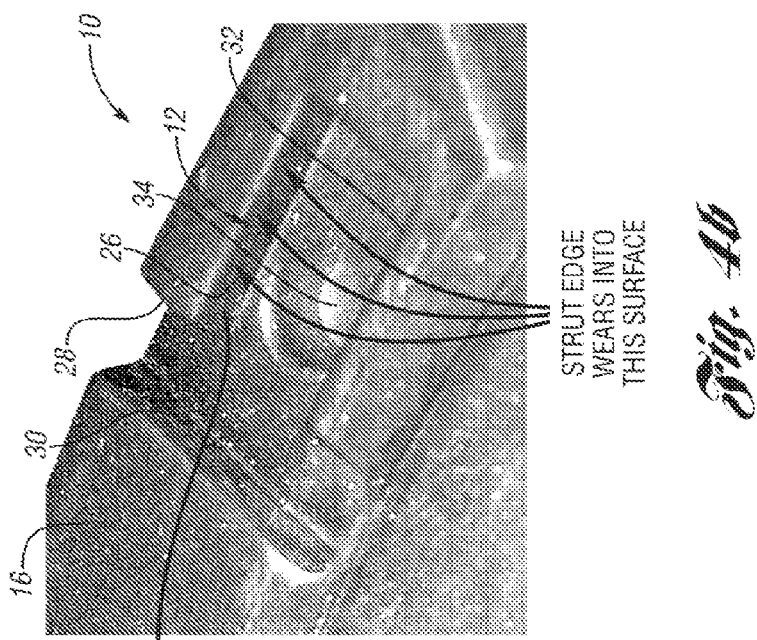
FIG. 4b is an enlarged perspective photorealistic view, partially broken away, of a pocket with captions superimposed thereon to indicate that the vertical outboard edge surface initially has a small draft due to cast tooling requirements.
Figure 4A:
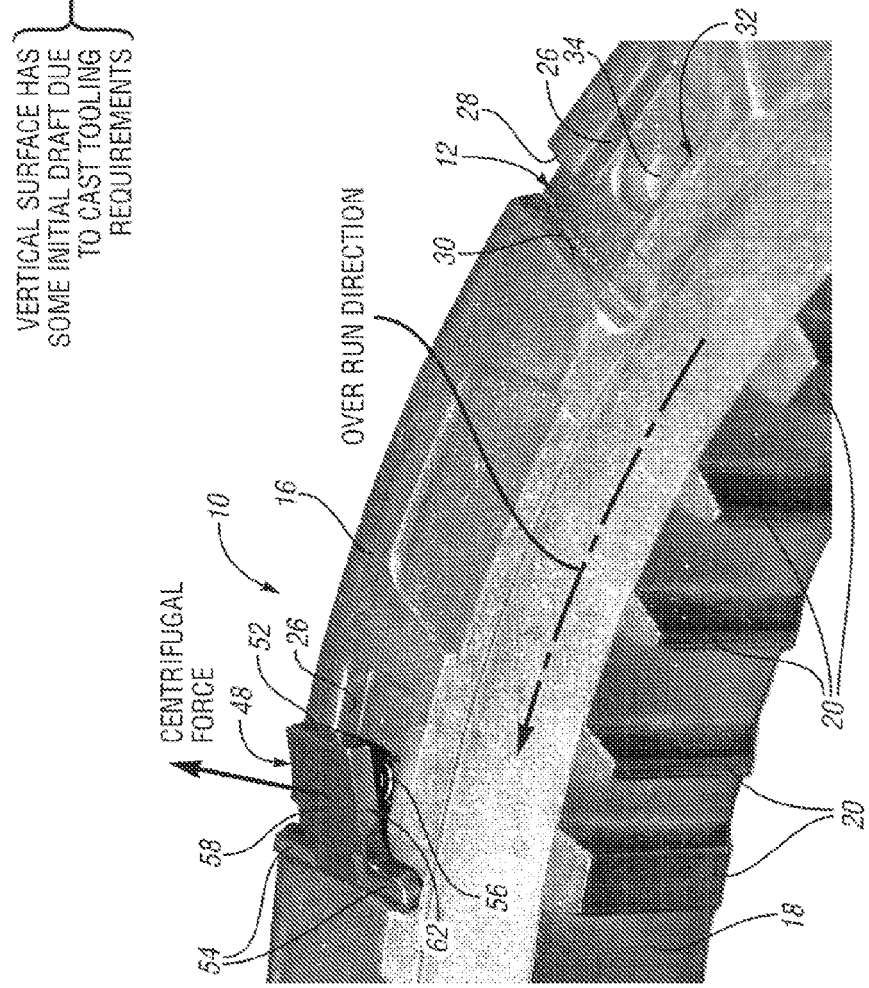
FIG. 4a is a perspective photorealistic view, partially broken away, illustrating an overrun direction of the pocket plate and the resulting centrifugal force operating on the spring-biased strut.

FIG. 4a is a perspective photorealistic view, partially broken away, illustrating an overrun direction of the pocket plate 10 and the resulting centrifugal force operating on the spring-biased strut 48.

FIG. 4b is an enlarged perspective photorealistic view, partially broken away, of a pocket 12 with captions superimposed thereon to indicate that the outboard edge surface 26 initially has a small draft (i.e., angled, slightly positive) due to cast tooling requirements. Also, the surface 26 is indicated as being worn by an edge of the side edge surface 62 of the strut 48.

FIG. 5a is a view of the pocket plate 10 similar to the view of FIG. 4b.

FIG. 5b is a side schematic view taken along lines 5b-5b of FIG. 5a and illustrating the pocket 12 of the pocket plate 10 wherein the wall or surface 26 of the pocket 12 has an angle (i.e. θ in FIG. 3). The relatively soft surface layer 40 of the wall or surface 26 is effectively machined or abrasively worn due to the up down motion of the relatively hard strut 48 within the pocket 12 during overrun. The strut 48 moves to the left as indicated by the arrow in FIG. 5b under the centrifugal force to its dashed position wherein a lower edge of one of the side surface 62 of the strut 48 creates a substantially vertical surface out of the previously slightly positively angled surface 26. In other words, the small amount of draft on the pocket wall or surface 26 is reduced and becomes vertical with a "step" below the resulting vertical surface 26. The resulting machined vertical surface 26 ensures that the strut 48 remains stable and is retained in its pocket 12 during overrun conditions. The abrasive wear or machining continues on the sacrificial layer 40 until the lower edge of the side surface 62 of the strut 48 encounters the harder substrate material in the base layer 42.

FIG. 6 is yet another photorealistic view, partially broken away, illustrating: a tooth reaction load on the splines 20 of the pocket plate 10; applied load on the end surface 52 of the strut 48; and a high compressive stress area of the pocket plate 10 caused by the second end surface 50 of the strut 48 in response to the load applied on the first end surface 52 when the strut 48 is performing its locking function with respect to a notch plate. The compressive stress area or head edge 30 of the pocket 12 also experiences polishing type wear due to the up-down motion of the strut 48. Further, the inboard edge or surface 32 experiences less severe wear.

FIG. 7a is a view similar to the view of FIGS. 4b and 5a after the strut 48 has worn the various sacrificial layers defining surfaces 26, 28, 30 and 32 of the pocket 12. FIG. 7b is an electron microscopic image which includes the surfaces 26 and 28 of FIG. 7a. Abrasive wear in each of the surfaces 26 and 28 is evident. FIG. 7c is an enlarged view indicated by the notation "7c" in FIG. 7b wherein wear and a step of apparent deformed metal are shown at the surface 28. FIG. 7d is an enlarged view indicated by the notation "7d" in FIG. 7b wherein wear and a step of apparent deformed metal are shown at the surface 26. Again, the wear and deformation are caused by the up and down motion of the strut 48 when the plate 10 is rotating, thereby causing the strut 48 to move laterally against the surface 26 by centrifugal force.

Figure 8:
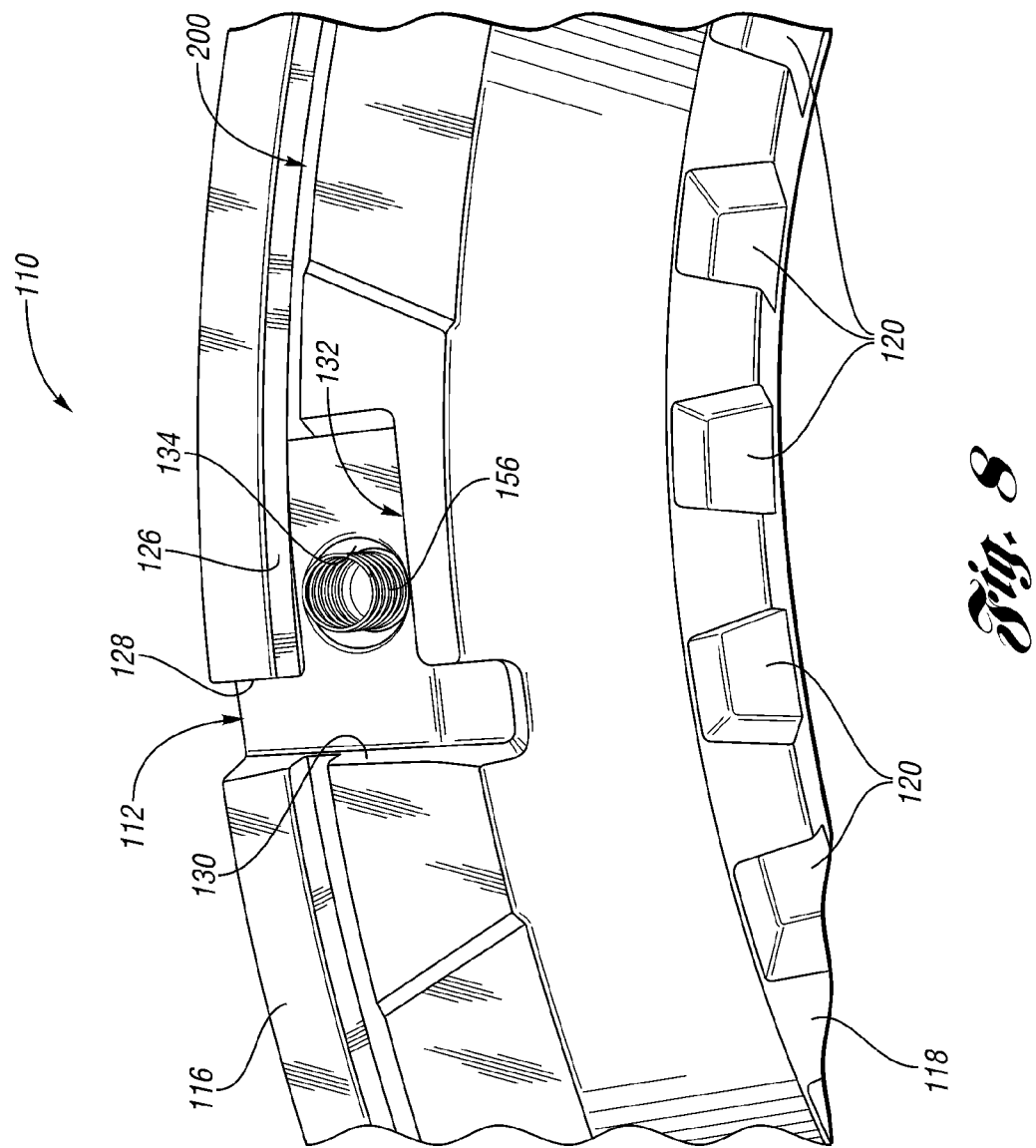
FIG. 8 is a view, partially broken away, of an embodiment of a coupling member of the invention.

FIG. 8 is a view, partially broken away, of an embodiment of a coupling member of the invention, generally indicated at 110. Each part or portion shown in FIG. 8 which is the same or similar in either structure or function to the part or portion illustrated in the previous Figures has "100" added to the reference number associated with that part or portion. For example, the coupling member 110 of FIG. 8 corresponds to the coupling member 10 of the prior Figures. However, it is to be understood that the diecasting material of FIG. 8 may or may not be strengthened by an alloying material such as Si particles. Also, it is to be understood that while a strut pocket in the member 110 is shown, rocker pockets populated with rockers in a rocker plate is also contemplated.

The coupling member 110 is substantially identical to the pocket plate or member 10 except a positively angled surface portion 126 of the coupling member 110 is machined such as by milling (or by lathe). A curved or circular groove 200 is preferably cut by the lathe on a center line or central axis (14 in FIGS. 3 and 5b) of the member 110. The machining results in the straight (i.e. 90°) or slightly negatively angled outer pocket wall or surface 126.

When the diecasting material is strengthened by an alloying material, the machining results in removal of a relatively soft depletion layer 40 (i.e. does not have particles of the strengthening alloy material) thereby exposing the hard silicon particles 44 which do not wear or deform during contact of a locking member or strut (i.e. 48 in FIGS. 3 and 6) against the machined surface 126 during overrun (thereby improving overrun life).

When the diecasting material such as aluminum is not strengthened by an alloying material, the resulting machined "truly vertical" or "slightly negative" vertical wall improves the stability of a strut or rocker (i.e. collectively referred to as "locking members") which experiences rotational centrifugal forces during overrun. Also, the "slightly negative" angle lowers the rpm even further at which a strut "locks down" due to such centrifugal forces.

Further, since the groove 200 is machined prior to use of the assembly, no loose metal debris such as metal chips and/or particles are created during overrun of the assembly.

Because of the above, there is a significant improvement performance of the assembly when the wall 126 in the pocket plate 110 is machined vertical or slightly negative versus a cast, positively angled, surface which may have a draft such as 1-2 degrees or 0.5-1 degrees (i.e. the surface is angled "slightly positive").

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling member for an engageable coupling assembly, the coupling member being formed as a unitary diecasting from a diecasting material in a diecasting process, the coupling member comprising:
   a coupling face having a pocket which is sized and shaped to receive and retain a locking member that moves in the pocket during an overrun condition of the assembly; and
   a plurality of pre-machined surface portions which define the pocket wherein an angled, positive surface portion of the surface portions is machined vertical or negative to improve performance of the assembly during the overrun condition and wherein the pre-machined surface portions are machined prior to the use of the member to obtain a machined surface portion with no loose debris created during the overrun condition, wherein the pre-machined surface portions have a surface finish different than that of the coupling face.

2. The coupling member as claimed in claim 1, further comprising a base portion having particles of a strengthening alloying material and wherein the particles of the alloying material are exposed after machining so that the base portion does not wear or deform during contact of the locking member against the base portion during the overrun condition.

3. The coupling member as claimed in claim 2, wherein the strengthening alloying material includes at least one of elemental Si, Cu, Mg, Ni and Zn.

4. The coupling member as claimed in claim 1, wherein the machined surface portion is an outboard edge surface.

5. The coupling member as claimed in claim 1 wherein the machined surface portion is curved.

6. The coupling member as claimed in claim 1, wherein the diecasting material is a non-ferrous alloy.

7. The coupling member as claimed in claim 1, wherein the coupling member is a pocket plate.

8. The coupling member as claimed in claim 1, wherein the locking member is a locking strut.

9. The coupling member as claimed in claim 1, wherein the coupling face is an annular coupling face.

10. The coupling member as claimed in claim 9, wherein the annular coupling face is oriented to face axially along a rotational axis of the assembly.

11. The coupling member as claimed in claim 9 wherein the annular coupling face is oriented to face radially with respect to a rotational axis of the assembly.

12. The coupling member as claimed in claim 1, wherein the coupling face has a plurality of pockets, each of the pockets being sized and shaped to receive and retain a corresponding locking member.

13. The coupling member as claimed in claim 1, wherein the coupling member is a clutch member.

14. The coupling member as claimed in claim 1, wherein the pocket has a T-shape.

15. The coupling member as claimed in claim 1, wherein the pocket has an inner recess for receiving a biasing spring and wherein the pocket is a spring pocket.

16. The assembly as claimed in claim 1, further comprising a machined groove connecting at least some of the plurality of machined surface portions.

17. A one-way clutch assembly having a central axis, the assembly comprising:
    an annular notch plate that extends around the central axis and includes notches spaced from each other about the central axis;
    a pocket plate being formed as a unitary diecasting from a diecasting material in a diecasting process, the pocket plate including:
    an annular coupling face having a plurality of pockets spaced from each other about the central axis, each of the pockets being sized and shaped to receive and retain a locking member that moves in the pocket during an overrun condition of the assembly;
    each of the pockets having a plurality of machined surface portions which define the pocket wherein an angled, positive surface portion of the surface portions is machined vertical or negative to improve performance of the assembly during the overrun condition and wherein the machined surface portions are machined prior to use of the assembly to obtain a machined surface portion with no loose debris created during the overrun condition, wherein the machined surface portions have a surface finish different than that of the coupling face; and
    a plurality of locking members received within the pockets.

18. The assembly as claimed in claim 17, wherein pocket plate further includes a base portion having particles of a strengthening alloy material and wherein the particles of the alloying material are exposed after machining so that the base portion does not wear or deform during contact of its respective locking member strut against the base portion during the overrun condition.

19. The assembly as claimed in claim 18, wherein the strengthening alloying material includes at least one of elemental Si, Cu, Mg, Ni and Zn.

20. The assembly as claimed in claim 17, wherein the machined surface portion is an outboard edge surface.

21. The assembly as claimed in claim 17, wherein the machined surface portion is curved.

22. The assembly as claimed in claim 17, wherein the diecasting material is non-ferrous.

23. A coupling member for an engageable coupling assembly, the coupling member comprising:
    a coupling face having a pocket which is sized and shaped to receive and retain a locking member that moves in the pocket during an overrun condition of the assembly; and
    a plurality of machined surface portions which define the pocket wherein an angled, positive surface portion of the surface portions is machined vertical or negative to improve performance of the assembly during the overrun condition and wherein the machined surface portions are machined prior to use of the member to obtain a machined surface portion with no loose debris created during the overrun condition, wherein the machined surface portions have a machined surface finish different than a surface finish of the coupling face.

24. The coupling member as claimed in claim 23, further comprising a base portion that does not wear or deform during contact of the locking member against the base portion during the overrun condition.

25. The coupling member as claimed in claim 23, wherein the machined surface portion is an outboard edge surface.

26. The coupling member as claimed in claim 23 wherein the machined surface portion is curved.

27. The coupling member as claimed in claim 23, wherein the coupling member is a pocket plate.

28. The coupling member as claimed in claim 23, wherein the coupling face is an annular coupling face.

29. The coupling member as claimed in claim 23, wherein the coupling face has a plurality of pockets, each of the pockets being sized and shaped to receive and retain a corresponding locking member.

30. The coupling member as claimed in claim 23, wherein the pocket has an inner recess for receiving a biasing spring and wherein the pocket is a spring pocket.

31. The coupling member as claimed in claim 23 wherein the annular coupling face is oriented to face radially with respect to a rotational axis of the assembly.

32. A one-way clutch assembly having a central axis, the assembly comprising:
   an annular notch plate that extends around the central axis and includes notches spaced from each other about the central axis;
   a pocket plate including:
   an annular coupling face having a plurality of pockets spaced from each other about the central axis, each of the pockets being sized and shaped to receive and retain a locking member that moves in the pocket during an overrun condition of the assembly;
   each of the pockets having a plurality of machined surface portions which define the pocket wherein an angled, positive surface portion of the surface portions is machined vertical or negative to improve performance of the assembly during the overrun condition and wherein the machined surface portions are machined prior to use of the assembly to obtain a machined surface portion with no loose debris created during the overrun condition wherein the machined surface portions have a surface finish different than that of the coupling face; and
   a plurality of locking members received within the pockets.

33. The assembly as claimed in claim 32, wherein pocket plate further includes a base portion that does not wear or deform during contact of its respective locking member against the base portion during the overrun condition.

34. The assembly as claimed in claim 32, wherein the machined surface portion is an outboard edge surface.

35. The assembly as claimed in claim 32, wherein the machined surface portion is curved.

* * * * *